(12) United States Patent
Schmeichel et al.

(10) Patent No.: US 7,815,239 B1
(45) Date of Patent: Oct. 19, 2010

(54) TONNEAU COVER ASSEMBLIES

(75) Inventors: Charles M. Schmeichel, Jamestown, ND (US); Steven C. Schmeichel, Jamestown, ND (US)

(73) Assignee: Agri-Cover, Inc., Jamestown, ND (US)

( * ) Notice: Subject to any disclaimer, the term of this patent is extended or adjusted under 35 U.S.C. 154(b) by 282 days.

(21) Appl. No.: 11/925,504

(22) Filed: Oct. 26, 2007

(51) Int. Cl.
*B60J 11/00* (2006.01)

(52) U.S. Cl. .................................. 296/98; 296/136.01

(58) Field of Classification Search .................. 296/98, 296/100.01, 100.11, 100.14–100.18, 136.01, 296/136.03, 136.1, 136.12; 135/907; 160/368.1
See application file for complete search history.

(56) References Cited

U.S. PATENT DOCUMENTS

| | | | |
|---|---|---|---|
| 1,500,091 A | 7/1924 | Weiske et al. |
| 2,906,323 A | 9/1959 | Macy |
| 3,923,334 A | 12/1975 | Key |
| 4,036,521 A | 7/1977 | Clenet |
| 4,272,119 A | 6/1981 | Adams |
| 4,757,854 A | 7/1988 | Rippberger |
| 4,838,602 A | 6/1989 | Nett |
| 4,923,240 A | 5/1990 | Swanson |
| 5,040,843 A | 8/1991 | Russell et al. |
| 5,058,652 A | 10/1991 | Wheatley et al. |
| 5,076,338 A | 12/1991 | Schmeichel et al. |
| 5,174,353 A | 12/1992 | Schmeichel et al. |
| 5,251,951 A | 10/1993 | Wheatley |
| 5,263,761 A | 11/1993 | Hathaway et al. |
| 5,350,213 A | 9/1994 | Bernardo |
| 5,364,154 A | 11/1994 | Kaiser |
| 5,480,206 A | 1/1996 | Hathaway et al. |
| 5,487,585 A | 1/1996 | Wheatley |
| 5,522,635 A | 6/1996 | Downey |
| 5,540,475 A | 7/1996 | Kersting et al. |
| 5,553,652 A | 9/1996 | Rushford |
| 5,584,521 A | 12/1996 | Hathaway et al. |
| 5,655,808 A | 8/1997 | Wheatley |
| 5,758,922 A | 6/1998 | Wheatley |
| 5,765,902 A | 6/1998 | Love |
| 5,788,315 A | 8/1998 | Tucker |

(Continued)

OTHER PUBLICATIONS

A picture taken in Sep. 1999, of a tonneau cover product shown at the Big Iron Farm Show in Fargo, ND, Shur-Co, Inc. of Yankton, SD; 1pg.

(Continued)

*Primary Examiner*—Lori L Lyjak
(74) *Attorney, Agent, or Firm*—Moore & Hansen, PLLP

(57) ABSTRACT

Elongated side rails for attachment to a sidewall of a truck cargo box as a portion of a tonneau cover assembly. Each assembly includes a flexible cover that can be operatively secured to side rails. One side rail includes a securing portion that can be operatively connected to the sidewall; an inclined portion extending from the securing portion, the inclined portion having first and second sides; a connecting member extending downwardly away from the inclined portion from a position located between the first and second sides; and a longitudinal portion extending from the connecting member opposite the inclined portion. To secure the cover to the side rails, hook fastener is preferably attached to loop fastener on the cover. One preferred side rail has a ridge to prevent premature engagement of the fasteners. Another preferred side rail has directional hook fastener to prevent premature engagement of the fasteners.

58 Claims, 10 Drawing Sheets

U.S. PATENT DOCUMENTS

| | | |
|---|---|---|
| 5,860,691 A | 1/1999 | Thomsen et al. |
| 5,906,407 A | 5/1999 | Schmeichel |
| 5,921,603 A | 7/1999 | Karrer |
| 6,024,401 A | 2/2000 | Wheatley et al. |
| 6,024,402 A | 2/2000 | Wheatley |
| 6,030,021 A | 2/2000 | Ronai |
| 6,053,556 A | 4/2000 | Webb |
| 6,053,558 A | 4/2000 | Weldy et al. |
| 6,234,561 B1 | 5/2001 | Huotari |
| 6,257,306 B1 | 7/2001 | Weldy |
| 6,257,647 B1 | 7/2001 | Ninness et al. |
| 6,258,311 B1 | 7/2001 | Jens et al. |
| 6,264,266 B1 | 7/2001 | Rusu et al. |
| 6,439,640 B1 | 8/2002 | Wheatley |
| 6,543,835 B2 | 4/2003 | Schmeichel et al. |
| 6,568,740 B1 | 5/2003 | Dimmer |
| 6,575,520 B1 | 6/2003 | Spencer |
| 6,607,234 B1 | 8/2003 | Schmeichel |
| 6,640,348 B1 | 11/2003 | Clune et al. |
| 6,672,644 B2 | 1/2004 | Schmeichel |
| 6,719,353 B1 | 4/2004 | Isler et al. |
| 6,814,388 B2 | 11/2004 | Wheatley |
| 6,851,738 B1 | 2/2005 | Schmeichel et al. |
| 6,893,073 B2 | 5/2005 | Wheatley |
| 7,172,008 B2 | 2/2007 | Vanbenschoten et al. |
| 2001/0020792 A1 | 9/2001 | Huotari |
| 2002/0022108 A1 | 2/2002 | Krantz et al. |
| 2002/0096910 A1 | 7/2002 | Schmeichel et al. |
| 2003/0197394 A1 | 10/2003 | Dimmer |
| 2004/0212212 A1 | 10/2004 | Spencer et al. |
| 2007/0029695 A1 | 2/2007 | Gallant et al. |

OTHER PUBLICATIONS

Drawing of a tonneau cover product shown in Sep. 1999 at the Big Iron Farm Show in Fargo, ND, by Shur-Co, Inc. of Yankton, SD; 1 pg.
Shur-Co., Inc., Oct. 1999, owner's manual; pp. 1-5.
Shur-Co., Inc., Dec. 2000, owner's manual; pp. 1-8.
Access® Roll-up Cover Owner's Manual, © 1996, AGRI-Cover, Inc.; pp. 1-7.

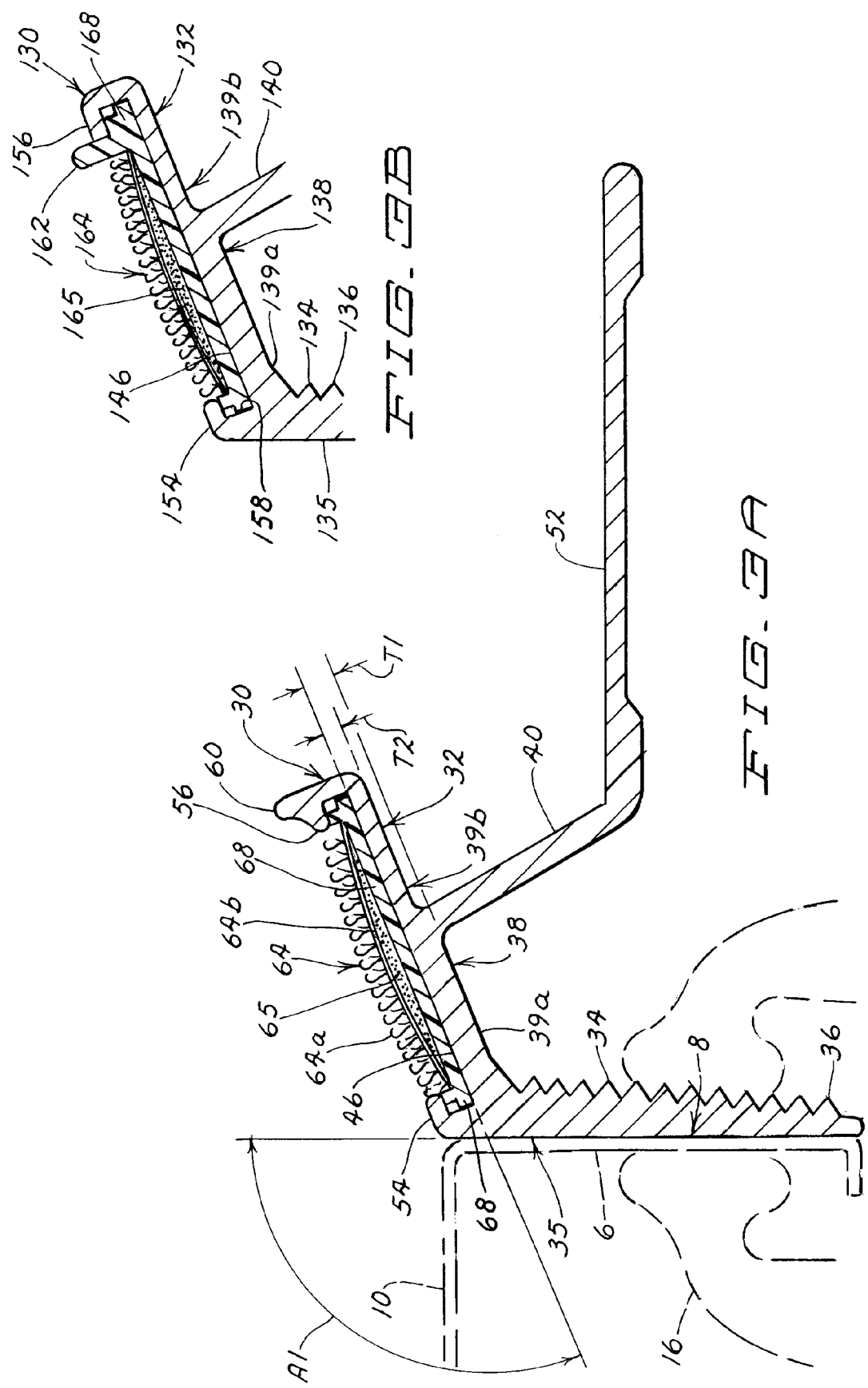

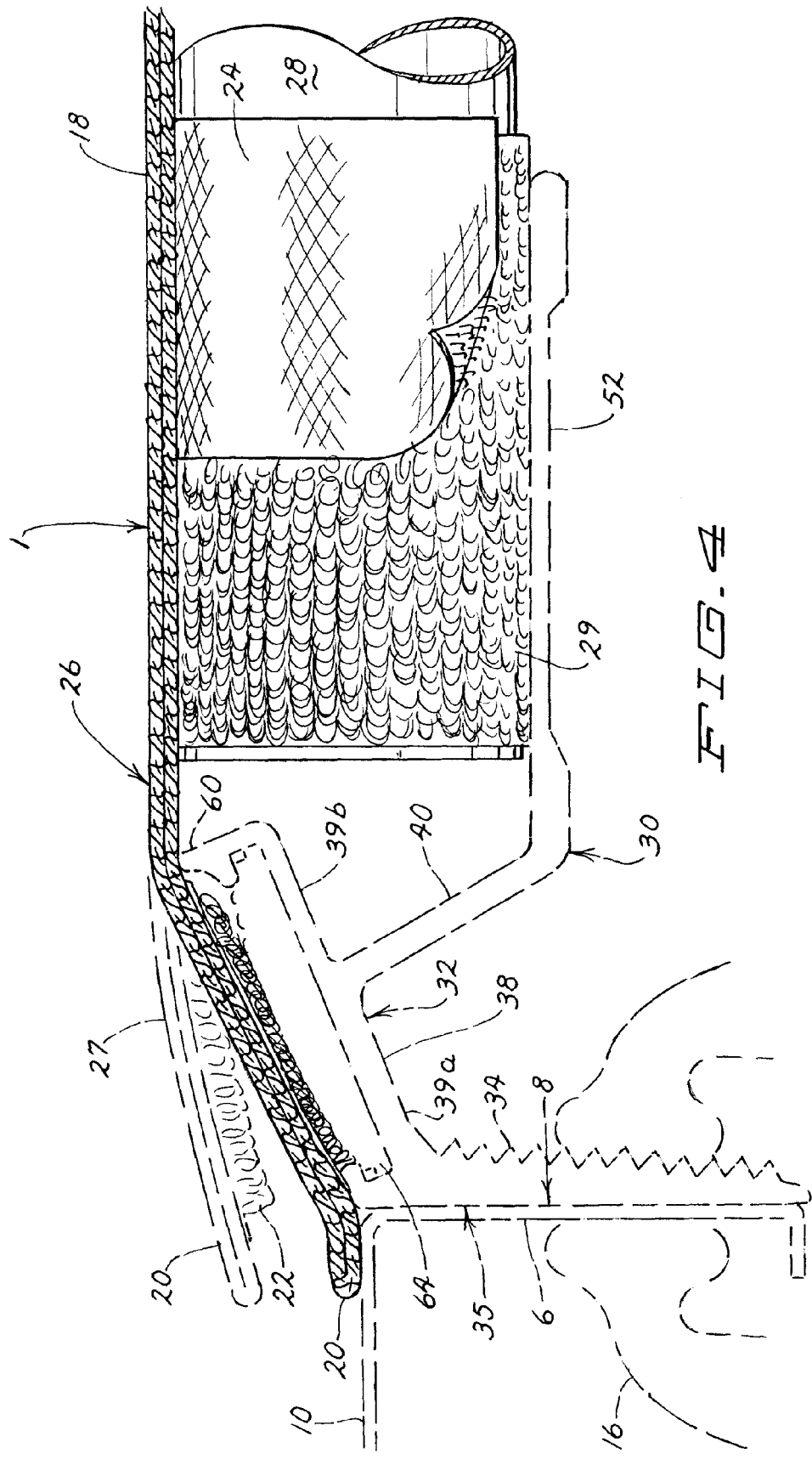

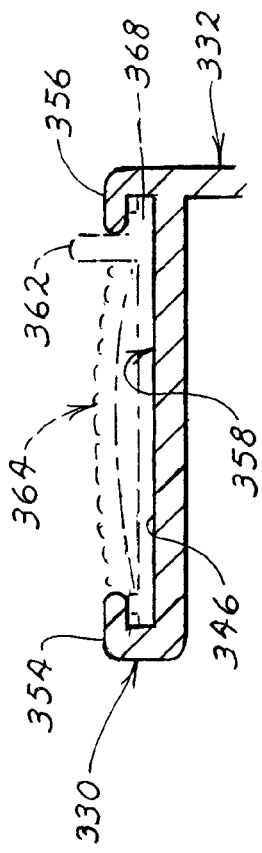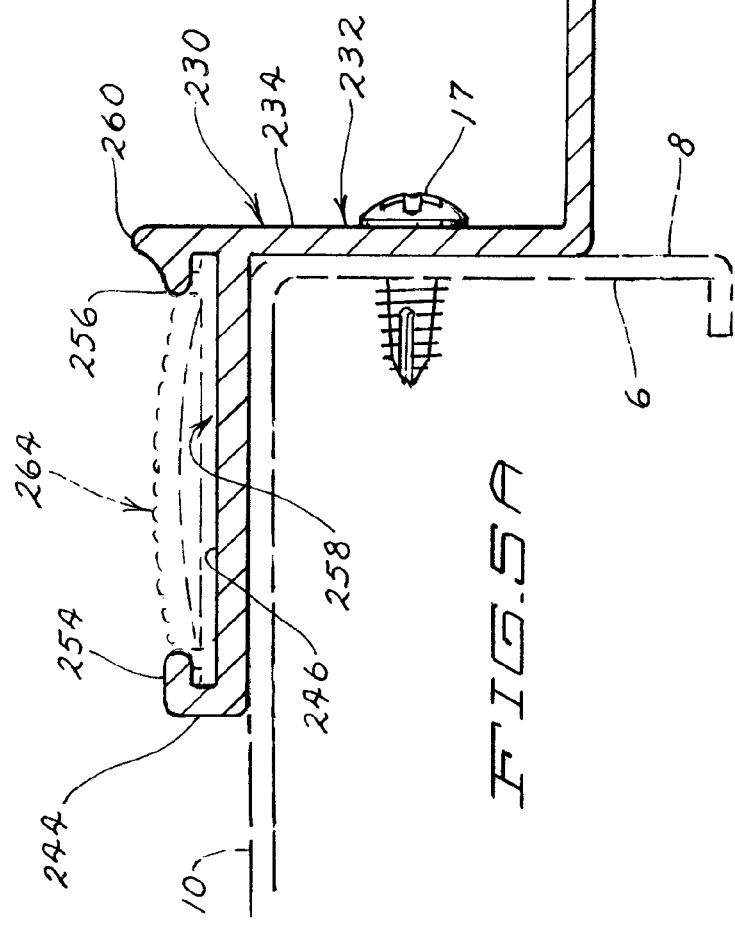

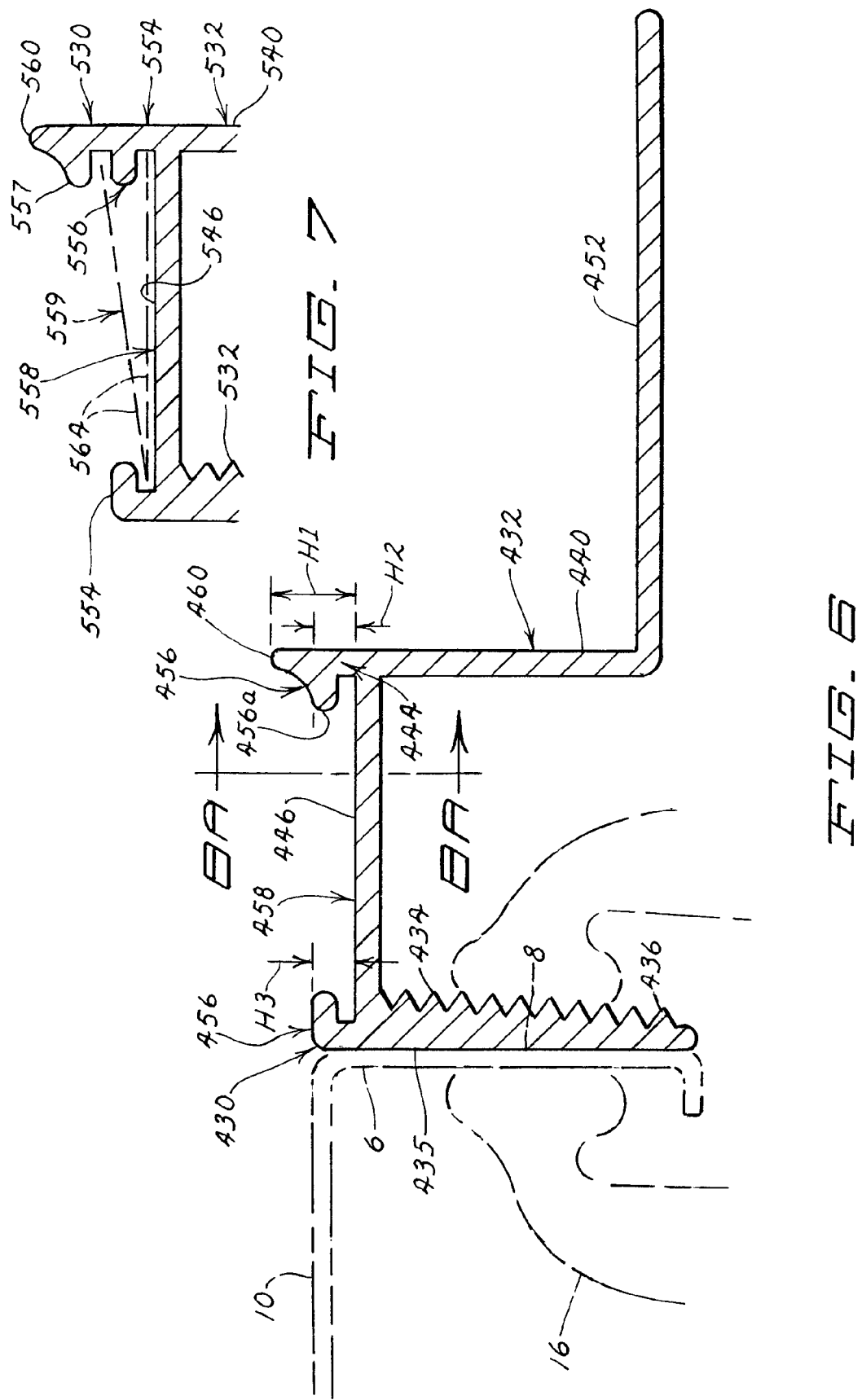

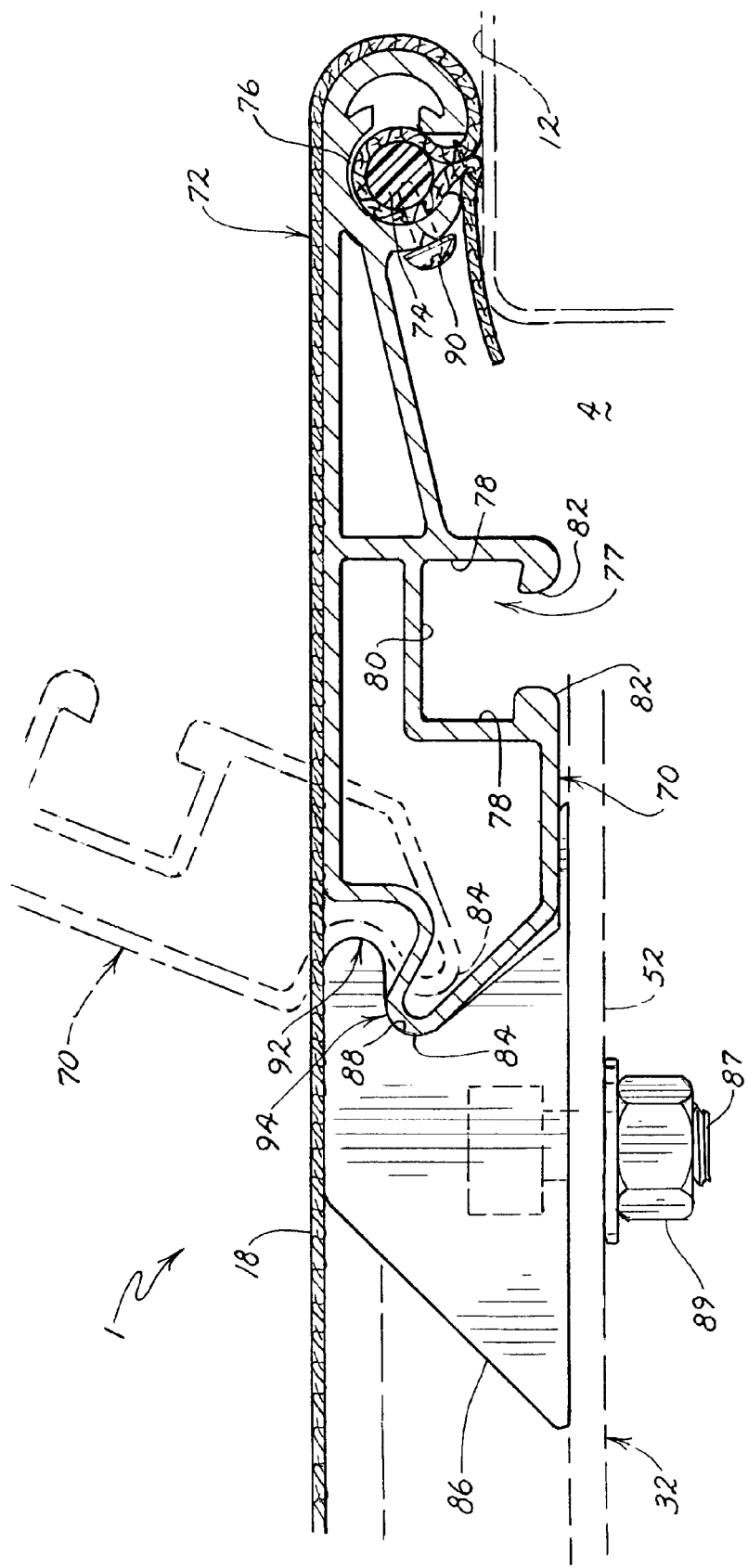

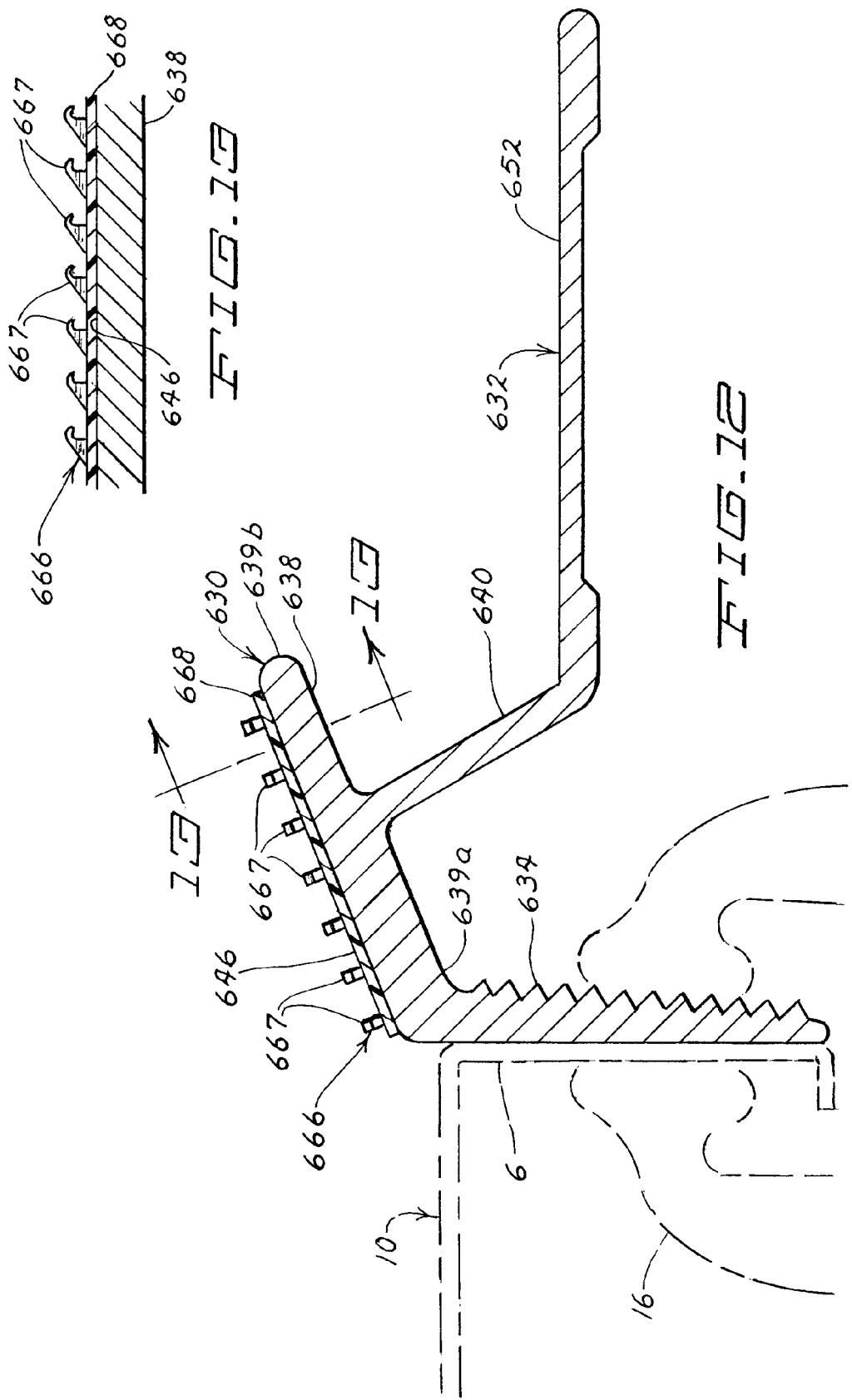

TONNEAU COVER ASSEMBLIES

FIELD OF THE INVENTION

Tonneau cover assemblies, particularly, Tonneau cover assemblies for roll-up covers including a flexible cover and an apparatus for attaching the flexible cover to a cargo box of a pickup truck. The present invention further relates to tonneau cover assemblies having side rails that are attached to sidewalls of the cargo box. The flexible covers can include hook and/or loop fasteners secured to each of the respective side rails.

DESCRIPTION OF THE RELATED ART

Numerous protective cover assemblies for preventing rain, debris and wind from damaging or disrupting the contents of a pickup truck bed are currently available. Generally, the covers are made of some sort of fabric, often a fabric coated with a polymeric material, which is detachably fastenable to a rigid frame so as to enclose and protect the pickup truck cargo box. The covering materials used are generally stretchable to the extent that once they are in a position to be secured, they are pulled taut and then attached to the frame by numerous methods such as snaps, grommets, or multi-directional hook-and-loop fasteners and stretcher bars.

Typical protective cover assembly frames include a pair of elongated side rails that are secured to the sidewalls of the cargo box. Various "low profile" side rails have been developed to achieve the desirable look of a cover that does not extend significantly above the top of the sidewalls of the pickup truck. Known side rails that provide a low profile appearance often include a component of multi-directional hook strip fastener secured on the side rail, typically within a horizontal channel that does not significantly extend above the top of the sidewall (see, e.g., U.S. Pat. Nos. 4,036,521 and 4,991,640 and 6,752,449). Inclined side rails having a component of multi-directional hook and loop fastener are also taught (see, e.g., U.S. Patent Appln. Pub. No. 2004/0212212 A1).

The present invention provides improvements which address limitations associated with the prior art.

SUMMARY

One preferred embodiment relates to an elongated side rail for attachment to a sidewall of a pickup truck cargo box as a portion of a tonneau cover assembly. This tonneau cover assembly preferably includes a flexible cover that can be operatively secured to two side rails, each of which are secured to one of the respective sidewalls of the pickup truck cargo box, one opposite the other, to form elements of a securing frame to which the flexible cover is secured when the tonneau cover assembly is closed or fully engaged. Each elongated side rail of this embodiment preferably includes a securing portion that can be operatively connected to the sidewall and an inclined portion extending from the securing portion, the inclined portion having a first edge and a second edge. The preferred side rail further includes a connecting member that extends downwardly away from the inclined portion from a position located between the first and second edges and a longitudinal portion extending away from the connecting member opposite the inclined portion. The side rails are preferably aluminum extrusions. In designing the cross-sectional shape of the preferred side rails, the present inventors discovered that, by interconnecting the longitudinal member to the center of an underside of the inclined portion with the connecting member placed between the edges of the inclined portions, considerable savings of materials and cost for materials can be derived from diminishing the thickness of the inclined portion that extends beyond the connecting member, because greater thickness is not required to support the longitudinal portion.

Preferably, to secure the flexible cover to each of these respective side rails, a first component of hook and loop fastener (first fastener component) is secured to the inclined portion of each side. The first fastener component reciprocates a second component of hook and loop fastener (second fastener component) that is located on the bottoms of each side of the flexible cover. In preferred embodiments, the tonneau cover assembly can have two securing plates attached to opposite ends of the flexible cover. The front securing plate is secured to the side rails at a forward end of the cargo box and the rear securing plate is secured to the side rails at the rear end of the cargo box to form the securing frame in a manner similar to that disclosed in U.S. Pat. Nos. 5,076,338 and 6,543,835, each of which is incorporated herein by reference. During development of embodiments having low profile side rails, the present inventors, discovered that, when the preferred cover is secured to the forward end and drawn over the top of the side rails, so that the rear securing plate can be engaged with securing plate engagement members on each of the respective side rails, the second fastener components on each of the bottom of each of the respective sides of the flexible cover might prematurely engage with the respective first fastener components on the respective inclined portions. This premature engagement of the respective fastener components was discovered to diminish the ability of the sides of the flexible cover to slide along the respective side rails to allow the flexible cover to become tautly drawn over the securing frame when the rear securing plate is engaged with respective side rails and pivoted into the closed position. It is not believed that this problem often arises when the angle between the engagement surface of the securing portion and the upper surface of the inclined portion is greater than 135°. It was discovered, however, that when this angle is 135° or less, premature engagement is likely to occur. To address this problem, the present inventors have discovered a number of ways to either prevent premature engagement or diminish the degree to which premature engagement diminishes the ability of the sides of the flexible cover to slide along the respective side rails when the rear securing plate is pulling the flexible cover over the securing frame so that it can be tautly secured. It will be appreciated that sales of tonneau cover assemblies will be diminished if a cover prematurely engages the fastener component on the side rails making it more difficult to close the cover assembly. This premature engagement diminishes the ability of the sides of the cover to easily slide rearward when the rear securing plate is being fully engaged, forcing the sides to pull the prematurely engaged second fastener component away from the first fastener component in a horizontal plane, which can damage both of the fastener components when pulled away in this way. It will be appreciated that the appearance of a flexible cover that is tautly drawn over a cargo box is desirable to consumers and that a tautly drawn flexible cover diminishes the possibility that rain water or snow will pool in low spots over the middle of the cargo box, which is also believed to be undesirable.

Preferably, each side rail of this and several other embodiments further includes a channel defined by retaining portions on each respective edge of the inclined portion. The side rail can have a low profile such that the flexible cover does not significantly extend above the sidewalls. In alternate low profile embodiments, the inclined portion preferably extends from the securing portion, relative to the engaging surface of the securing portion that engages the sidewall, at an angle ranging from between about 90° to about 135°. In certain alternate embodiments, the inclined portion has a ridge extending generally along the length of the side rail proximate an edge of the inclined portion closest to, or most proximate to, a center of the flexible cover, such that when the flexible cover is pulled over the cargo box, the longitudinal sides of the cover ride along the ridges such that the respective second fastener components do not prematurely engage the corresponding first fastener components on the respective side rails. This permits the flexible cover to be drawn tautly over the securing frame when the rear securing plate is placed into a closed position. Once the cover is secured tautly over the securing frame, the lateral sides of the cover can be pressed down on the respective side rails, so that the respective second fastener component can engage the first fastener component on the respective side rails.

Many flexible cover roll-up tonneau covers have been sold in the United States and elsewhere. Examples include the tonneau covers disclosed in U.S. Pat. Nos. 5,076,338 and 6,543,835 referenced above. As the present embodiment incorporates design changes made to the side rails for tonneau cover assemblies such as these tonneau covers, particularly to make tonneau covers having a lower profile, the angle of incline of the surface to which the first fastening component is attached has, in some cases, increased with respect to the engagement surface of the securing portion so that the plane in which the first fastener component resides has moved closer and closer to being horizontal. This allows the second fastener component to engage the first fastener component when the flexible cover is first drawn over the securing frame, but before the securing plate at the rear of the pickup truck is fully engaged with the respective securing plate engagement members associated with the respective side rails. This premature engagement of the respective fastener components can lead to damage of the hook and loop structures are pulled horizontally with respect to one another when the securing plate at the rear of the truck pulls the flexible cover tightly over the securing frame as it is pivoted into full engagement with the side rails, and the respective sides of the flexible cover often need to be disengaged and than reengaged with the respective side rails so that the sides can be aligned with the rest of the flexible cover to evenly secure the cover over the securing frame. Premature engagement of the first and second fastener components typically occurs when the lateral sides of the cover, including the respective second fastener components, flop down onto the side rails and the inclined surface to which the first fastener component is attached before the flexible cover is drawn tightly over the securing frame so that it is stretched tautly over the frame. In the older covers, that did not have particularly low profiles, this was not a problem because the height of incline prevented the respective sides of the flexible covers from flopping down on the respectively first fastener components, because the incline of the first fastener was greater and the lateral sides of the flexible covers included a stiffener portion in which the flexible cover material was folded over to create a greater stiffness at the edges of the respective sides. This is still generally the case, but the lower angle of incline, which can be anywhere from 45° to less, even approaching zero with respect to a horizontal plane, has reduced the effectiveness of this stiffened portion. In certain preferred embodiments, however, the side rail will include a ridge. The ridge, supports the stiffened lateral side of the flexible cover, to which the second fastening component is attached, so that it is largely prevented from flopping down on a receiving surface of the side rail, where the first fastener component is attached. In this way, the ridge largely prevents the second fastener component from prematurely engaging the first fastener component and largely diminishes any difficulty a tonneau cover owner might have drawing the flexible cover tautly over the securing frame on the cargo box.

Alternate embodiments of the present invention address this potential problem in further ways. It will be appreciated that a ridge need not be continuous. A discontinuous or intermittent ridge will also effectively support the stiffened sides of the flexible cover, largely preventing the premature engagement. Similarly, the ridge need not be a part of the edge of the inclined portion, but can alternately be a part of a first fastener strip, so long as the fastener strip is inserted into the channel so that the ridge on the edge of the fastener strip is located on the side of the respective inclined portions proximate the center of the center of the cargo box. This ridge can also be discontinuous. Other mechanisms for providing a ridge or an intermittent ridge on the side of the incline portion proximate the center of the cargo box, such as a separate channel insert designed to reside in the channel with the first fastener component are also contemplated.

The inventors, after becoming aware of the premature engagement problems that occurred during development of new low profile tonneau covers having hook and loop fastener components, discovered that this premature engagement problem, which limits a user's ability to effectively fully engage the rear securing plate so that the flexible cover can be tautly secured over the cargo box when the front securing plate is already engaged, also can be addressed using a newly developed directional hook fastener strip on the inclined portion and loop fastener on the underside of stiffened edge of the sides of the flexible cover. The inventors discovered that the directional hook fastener, which has never been used before on a truck cover side rail, surprisingly permits the hook fastener on flexible cover to be drawn over the directional hook when the rear securing plate is engaged with the respective side rails. So, while there may be some premature engagement of the hook fastener component on the underside of the respective stiffened edges of the respective sides of the flexible cover and the directional hook fastener component on the inclined portion of the side rail, when the flexible cover is drawn toward the rear of the cargo box as the rear securing plate is engaged, the flexible cover can be drawn tautly over the cargo box rather easily because the directional hook component releases the loop component when it is pulled horizontally with respect to the directional hook, allowing the loop to slide over the directional hooks without causing damage to the loop or the directional hook structures, so long as the directional hooks are oriented in the direction of the rear of the cargo box.

Both the ridge and the directional hook component on the incline portion of the side rail allow the flexible cover to have "slidable" engagement fasteners because each system permits the lateral sides of the flexible cover to slide over the side rail as the cover is drawn tautly over the cargo box during the engagement process.

It will also be appreciated from a review of the drawings that the inclined portion of the present side rails need not necessarily be inclined, but may instead be "flat" in which case the surface of the inclined portion will be oriented at a 90° angle with respect to the engagement surface of the securing portion as shown in FIGS. 6 and 7.

Another preferred embodiment of the present invention relates to an elongated side rail for attachment to a sidewall of a pickup truck cargo box having a front and a tailgate, the elongated side rail being a portion of a tonneau cover assembly. The elongated side rail includes a securing portion that can be secured to the sidewall. The elongated side rail further includes a fastener support member interconnected to the securing portion, the fastener support member including a receiving surface having first and second edges. The first edge is closest to the cargo box when the elongated side rail is operatively secured to the sidewall. The elongated side rail also includes a component of strip fastening material that is secured on the receiving surface between the first and second edges and has a height. The preferred elongated side rail includes a ridge located proximate the first edge of the receiving surface. The ridge has a height higher than the height of the fastening strip and extending above the second edge such that the ridge generally prevents premature engagement of the components of strip fastening material when the flexible cover is being drawn over the cargo box.

In alternate embodiments of the present invention, the ridge can have numerous configurations. The ridge can be a continuous raised portion extending generally along the receiving surface or the ridge can be a plurality of raised portions. In addition, the ridge can be located along the entire length of the side rail or, alternatively, can extend along only a part or parts of the length of the side rail.

Yet another preferred embodiment of the present invention relates to an elongated side rail for attachment to a sidewall of a pickup truck cargo box as a portion of a tonneau cover assembly having a flexible cover that can be secured over the cargo box. The preferred elongated side rail includes a securing portion that can be secured to the sidewall and a fastener support member interconnected to the securing portion. The fastener support member includes a receiving surface having a first edge and a second edge and an elongated strip component of directional hook fastener located between the first and second edges. The preferred elongated strip component of directional hook fastener is of the type having a plurality hooks that generally all face the same direction such that the hook fastener will engage corresponding loop fastener on the flexible cover in only one direction.

The use of directional hook fastener is particularly useful in embodiments where the receiving surface is generally horizontal ("low profile" tonneau covers). Generally, horizontal receiving surfaces having multidirectional hook fastener often prematurely engage the corresponding loop fastener of the cover as the cover is being pulled over the cargo box. Premature engagement damages the fastener and makes it difficult to attach and properly tension the cover. Directional hook fastener, when secured to the receiving surface such that the hooks face the tailgate, will allow the cover to slide in the direction of the tailgate but without subjecting the respective fastener components to damage can be purposefully engaged with the loop fastener by simply pressing the loop fastener down on to the directional hook fastener.

These and various other advantages and features of novelty which characterize the present invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described a preferred embodiment of the present invention.

BRIEF DESCRIPTION OF THE DRAWINGS

The following detailed description of the invention can be better understood with reference to the accompanying drawings, wherein

FIG. 3A is a cross-sectional view of the side rail of the tonneau cover apparatus of FIG. 2 as viewed along line 3A-3A of FIG. 2; the side rail is attached to a sidewall of the cargo box (the flexible cover and other elements shown in FIG. 2 have been omitted for clarity);

FIG. 3B is a partial, cross sectional view of an alternate embodiment of a side rail, similar to that of FIG. 3B, but illustrating an alternate ridge configuration in which the side rail does not have a ridge and the ridge is part of a first fastener component within a channel in the side rail;

FIG. 4 is a cross-sectional view of the side rail of FIGS. 1-2 as viewed along line 4-4 of FIG. 2 showing a first covered position (in phantom) in which the flexible cover is draped over the cargo box and the ridge supports the stiffened portions of the flexible cover so that the second fastener component does not prematurely engage the first fastener component; and a second covered position in which the second fastener component on the flexible cover is engaged with the first fastener component on the side rail;

FIG. 5A is an cross-sectional view similar to that of FIG. 3A of another embodiment of a side rail;

FIG. 5B is a partial, cross-sectional view similar to that of FIGS. 3B and 5A of another embodiment of a side rail;

FIG. 6 is an cross-sectional view similar to that of FIGS. 3A and 5A of an additional embodiment of a side rail;

FIG. 7 is a partial, cross-sectional view similar to that of FIG. 5B of yet another embodiment of a side rail in which fastener strips are shown schematically in two different positions;

FIG. 9 is a partial, cross-sectional view of a rear securing plate of the tonneau cover apparatus as viewed along line 9-9 of FIG. 1, the securing plate having an open position (shown in phantom) and a secured or fully engaged position in which the securing plate is engaged with engagement members associated with each of the respective side rails;

FIG. 12 is an cross-sectional view similar to that of FIG. 3 of another embodiment of a side rail, the side rail having directional hook fastener component; and FIG. 13 is a partial, cross-sectional view of the directional hook fastener component of FIG. 12 as viewed along line 13-13 of FIG. 12.

DETAILED DESCRIPTION OF THE PREFERRED EMBODIMENTS

Figure 1:
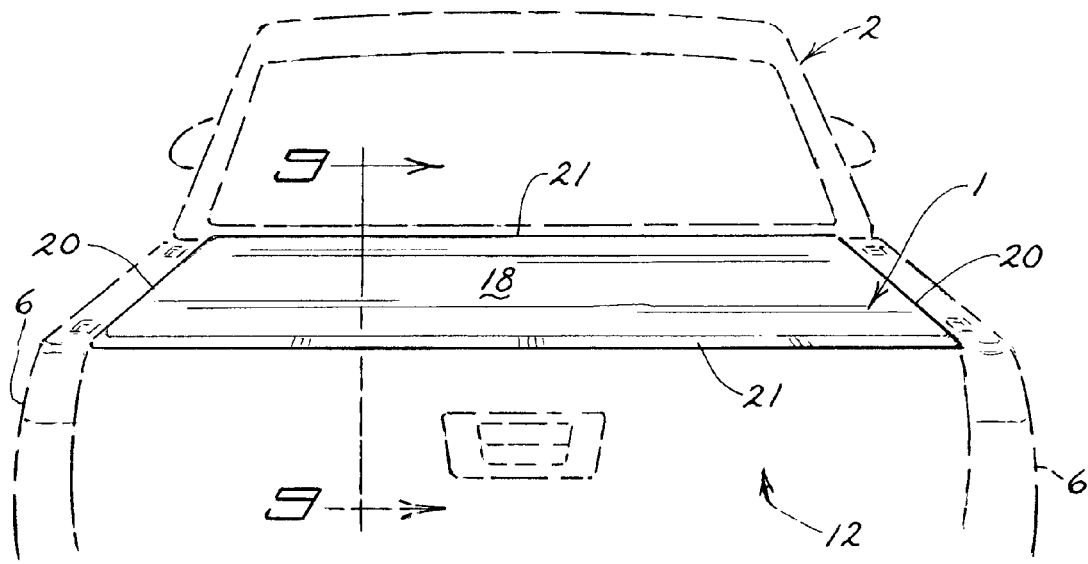
FIG. 1 is an end view of a tonneau cover apparatus of the present invention installed over a cargo box of a pickup truck (shown partially, in phantom)
Figure 2:
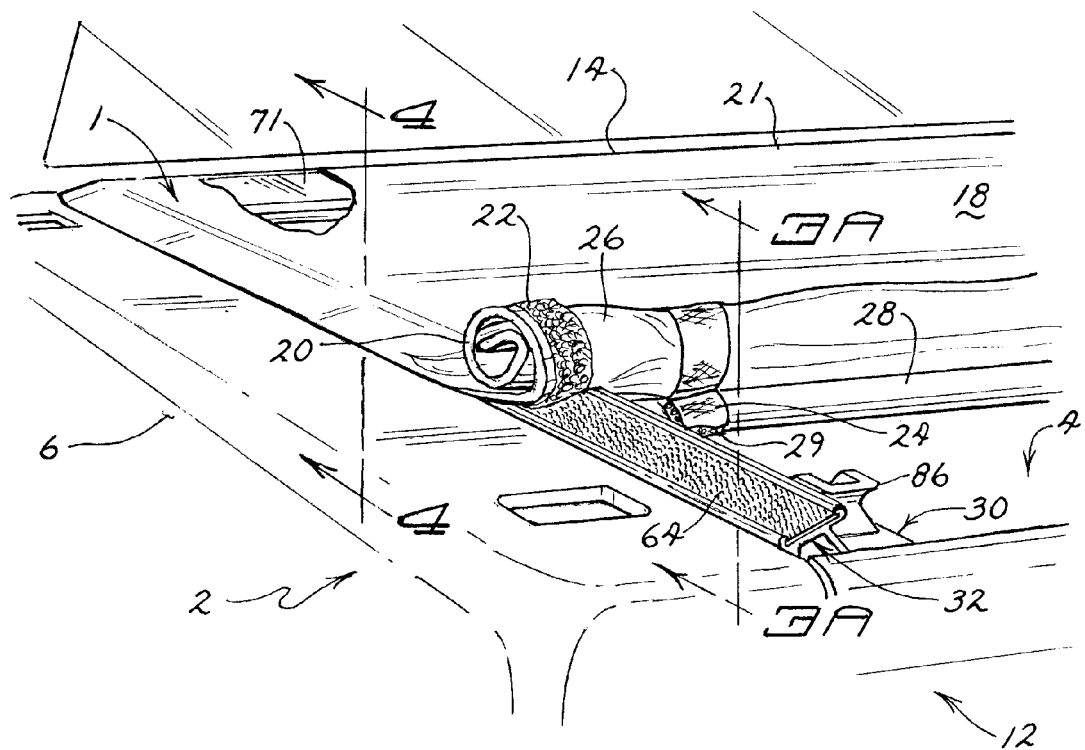
FIG. 2 is a partial, perspective view of the tonneau cover apparatus of FIG. 1, wherein the tonneau cover apparatus includes a flexible cover that has been partially rolled-up to expose a portion of a side rail.

Referring now to the drawings, particularly FIGS. 1-2, there is illustrated a preferred embodiment of a tonneau cover apparatus 1 attached to a pickup truck 2. The pickup truck 2 has a cargo box 4 at least partially defined by two opposing sidewalls 6, a tailgate 12 and a front wall 14. The tonneau cover apparatus 1 includes a flexible cover 18. The flexible cover 18 includes opposing longitudinal sides 20 and opposing lateral sides 21 or ends 21. FIG. 1 illustrates the flexible cover 18 drawn tautly draped over the cargo box 4 of the pickup truck 2 when the tonneau cover apparatus 1 is in a closed position. FIG. 2 partially illustrates a tonneau cover apparatus 1 in an open position when the flexible cover 18 is partially rolled up. Referring now also to FIGS. 3A and 4; each outer sidewall 6 has an inner surface 8 and a top surface 10. The flexible cover 18 is preferably constructed of somewhat resilient fabric material which is laminated to a polyester sheet to give it strength, flexibility, and water resistance.

Figure 10:
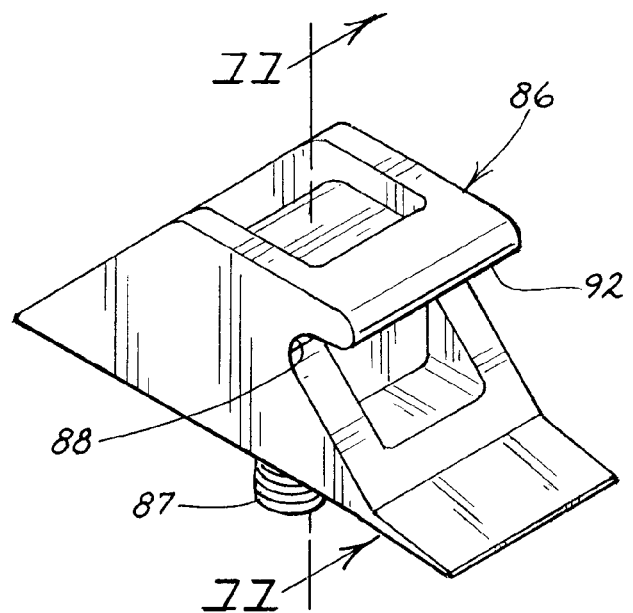
FIG. 10 is a perspective view of the engagement member of FIG. 9.
Figure 11:
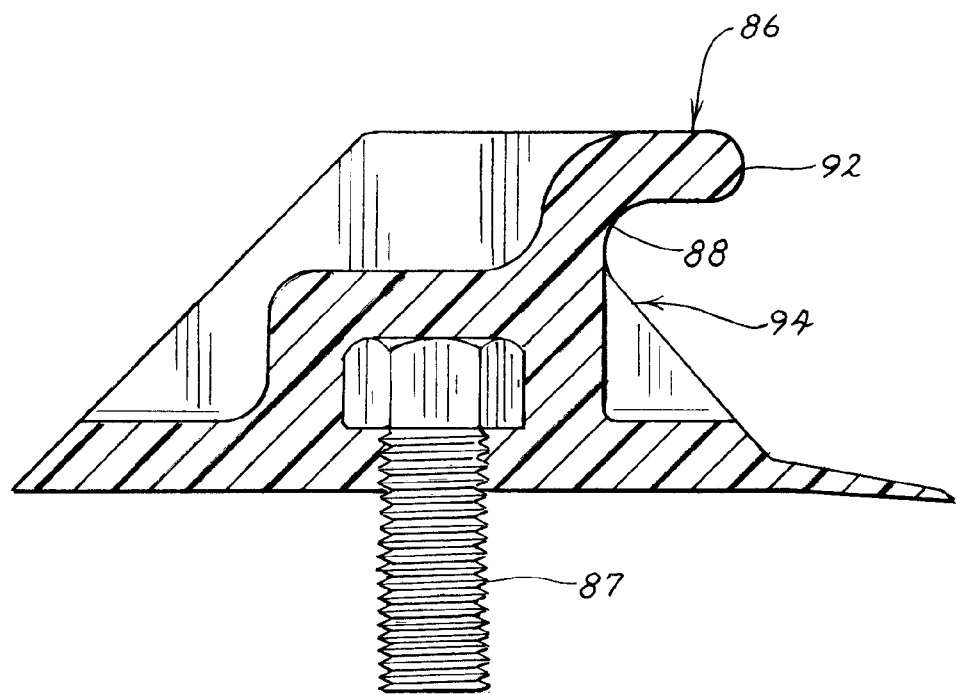
FIG. 11 is a cross-sectional view of the engagement member of FIG. 10 as viewed along line 11-11 of FIG. 10.

Referring now also to FIGS. 9-11, the respective lateral sides 21 of the flexible cover 18 are preferably attached to respective securing plates 70, 71. The rear securing plate 70 is shown in FIG. 9 and the front securing plate 71 is shown in FIG. 2. The flexible cover 18 can be secured to a side rail assembly 30 that includes two side rails 32 that are secured to the respective sidewalls 6 of the pickup truck 2 by securing the respective securing plates 70, 71 to the side rails 32 to form a securing frame (not shown) consisting of the two opposing side rails 32, to which the respective securing plates 70, 71 are attached proximate respective ends of the cargo box 4, when the tonneau cover apparatus 1 is closed. The inclined position 38 includes a receiving surface 46 that resides generally in an inclined plane that is consistent with the receiving surface. The connecting member 40 extends downwardly away from the inclined portion 38 at an angle of about 90° relative to the inclined plane.

Each of the preferred side rails 32, as illustrated in FIGS. 2-3A, includes a securing portion 34 having an engaging surface 35 that is preferably secured to an inner surface 8 of a respective sidewall 6 with, for example, a series of clamps 16 positioned along the side rail 32. Preferably, in embodiments where the securing portion 34 is secured to the respective sidewall 6 with clamps 16, the securing portion 34 has a grooved surface 36 to enhance the grip of the clamp 16.

Referring now particularly to FIG. 3A, showing the preferred side rail 32 of FIGS. 2 and 9 in lateral cross-section, the side rail 32 includes an inclined portion 38 that has a thick portion 39a and a thin portion 39b separated by a connecting member 40 that extends generally perpendicularly away from the inclined portion 38 to a longitudinal portion 52. The greater thickness T1 of the thick portion 39a gives side wall 32 greater strength between the securing portion 34 and the connecting member 40, where strength is most needed to support the weight of the flexible cover 18, the securing plates 70, 71 and support members 28, which essentially rest on the longitudinal portion 52 when the tonneau cover apparatus 1 is closed or when it is partially opened and the flexible cover 18 is partially rolled up. By limiting the distance between the securing portion 34 and the connecting member 40, the inventors isolated stress from supporting the weight of these parts of the apparatus to the thick portion 39a of the inclined portion 38 and the areas that are interconnected to the securing portion 34 and the connecting member 40. For this reason, there is little need for the thin portion 39b, which extends beyond the interconnection with the connecting member 40, to have a thickness that is as great as the thickness of the thick portion 39a. For that reason, the thickness T2 of the thin portion 39b is thinner than the thickness T1 of the thick portion 39a, preferably about 10% thinner, more preferably about 25% thinner, more preferably about 40% thinner. In the most preferred embodiment, T1 is 0.110 inches and T2 is 0.062 inches.

In certain embodiments, the inclined portion 38 has a receiving surface 46 and proximal and distal retaining portions 54, 56, that cooperate to form a channel 58. Within the channel 58 or, alternatively, simply on the receiving surface 46, a strip of hook and/or loop fastening material 64 can be secured that reciprocates or corresponds to a strip of hook and/or loop fastening material 22 on the longitudinal sides of the flexible cover 18 for securing the flexible cover 18 over the cargo box 4. As shown, the components of strip fastener 22, 64 can be multi-directional hook fasteners and loop fasteners, respectively. In preferred embodiments, the loop component of strip fastener is secured to a stiffened portion 26 of the flexible cover 18 where a edge of the cover has been folded under so that the stiffened portion 26 has a double thickness of the material use to make the flexible cover 18.

In "low profile" embodiments, when the inclined portion 38 or receiving surface 46 extends from the securing portion 34 at an angle A1 about 135° or less, relative to the engaging surface 35 of the securing portion 34, the side rail 32 will preferably include a ridge 60 extending upwardly and along the distal retaining portion 56 in preferred embodiments. In preferred embodiments the angle A1 will be from about 135° to about 90°, preferably from about 135° to about 100°. In the embodiment show in FIG. 3, the angle A1 is 112°. The ridge 60 supports the longitudinal sides 20 of the flexible cover 18 above the component of strip fastener 64 on the side rail 32 so that the cover 18 can be draped over the cargo box 4 without having the strip fastener 22 on the stiffened portion 26 of the flexible cover 18 flop down on the strip fastener 34 associated with the respective side rail 32, such that the respective fastener components 22, 64 prematurely engage.

As shown in phantom in FIG. 4, the ridge 60 will provide support for the stiffened portion 26 of the longitudinal side 20 of the flexible cover 18 to keep it above the fastener component 64 on the side rail 32, when the flexible cover 18 is first draped over the respective side rails 32 in a process of closing the tonneau cover apparatus 1. As the flexible cover 18 is drawn more tightly over the cargo box 4 and the rear securing plate 70 is fully engaged with securing plate engagement members 86 on each of the opposing side rails 32, the outer part of the stiffened portion, to which the loop fastener component 22 is attached, will remain separated from the hook fastener component 64 until the user presses down on the outer portion 27 of the stiffened portion 26 enough to engage the loop fastener component 22 with the hook fastener component 64 as shown in FIG. 4. Without this downward force on the stiffened portion 26, the loop fastener component 22 would not ordinarily become easily engaged with the hook fastener component 64, because the ridge 60 provides a sufficient obstacle to keep the two fastener components 22, 64 separated.

Premature engagement of the components of strip fastener 22, 64 often results in torn or damaged fastener components, while also making it difficult to properly position and tension the flexible cover 18 over the cargo box 4. The ridge 60 can be used in conjunction with the retaining portions 54, 56 to secure the first component of strip fastener 64 or can be used in embodiments without retaining portions 54 where the first component of strip fastener 64 is secured on the receiving surface 46 with other methods such as adhesives, rivets or the like (see e.g. FIG. 12). It will be appreciated that the channel 58 will not be necessary if an alternate component of hook and/or loop fastener (not shown) is secured to the receiving surface 46 with an adhesive or with pop rivets or the like, and that the retaining portions will not be required either. In this situation an alternate distal retaining portion could simply include a ridge (not shown) to support the sides 20 of the flexible cover 18 to minimize premature engagement.

It will be appreciated that the side rails do not have to have a channel 58 or a ridge 60, but that these aspects of the present side rails are desirable is certain preferred embodiments such as the one shown in FIGS. 3A and 4. The fastener strip 64 preferably includes multi-directional hooks 64a extending from a fabric based strip fastening material 64b that is secured by a polymeric adhesive material 65 to a plastic slat 68 that is engaged within the channel 58.

In FIG. 4, a support member or bow 28 is shown that supports the flexible cover 18. There is generally a plurality of support members 28 supporting the flexible cover 18 in preferred tonneau cover assemblies. The support members 28 traverse the space between the opposing side rails 32 secured to opposing side walls 6 of the cargo box 4. In preferred embodiments, the support members 28 are attached to the flexible cover 18 by securing a first strip of hook and/or loop fastener material 24 to an underside of each side 20 or of the flexible cover 18, so that a second reciprocating hook and/or loop fastening strip 29, attached to each end of the support member 28, will be sufficiently engagable by the first strip 24 to disengagably secure each end of the support member 28 to the flexible cover 18.

The lateral cross-section of yet another embodiment of a side rail 132 is illustrated in FIG. 3B. In this embodiment, the side rail 132 includes a fastening component 164 including a fabric strip fastening material 164b, including multi-directional hook components 164a secured to a slat 168. The slat 168 includes a ridge 162. This fastening component 164 does not require a ridge on the distal retaining portion 156, because the slat 168 provides the ridge 162, which can support the stiffened portion 26 of the flexible cover 18 in the same manner as the stiffened portion 26 is supported by the ridge 60 shown in FIG. 4. Preferably, the slat 168 is made of an extrudable material so that the ridge 162 can be formed by extruding the slat 168 to include the ridge 162. Once the slat 168 is formed, the respective fabric strip fastening material 164b can be secured to the slat 168. The slat 168 is preferably arranged and configured such that the slat 168 can slide into and be retained within a channel 158 that is at least partially formed by two retaining portions 154, 156 and a receiving surface 146 of the inclined portion 138. Similar to the embodiment of FIG. 3A, the inclined portion 142 is interconnected to a securing portion 134 having a grooved surface 136 that can be clamped to the sidewall 6 of a pickup truck 2. In addition, the preferred inclined portion has a connecting member 140 extending downwardly from the inclined portion 142 in between first and second edges 148, 150 of the receiving surface 146 to save on material costs as discussed above.

FIG. 4 illustrates the side rail 32 of FIG. 3A in operation. In use, the flexible cover 18 is draped from one lateral side 21 of the cargo box 4 to the other. As the flexible cover 18 is being pulled over the cargo box 4, the ridge 60 is arranged and configured to support the first component of strip fastening material 22 above the second component of strip fastening material 64 on the side rail 32 such that the two components of strip fastening material 22, 64 do not engage while the flexible cover 18 is being draped over the cargo box 4 (as shown in phantom). Also shown in FIG. 4 is a support bar 28. The preferred flexible cover 18 includes a plurality of support bars 28 that extend from one longitudinal side 20 of the flexible cover 18 to the other longitudinal side 20. As the flexible cover 18 is unrolled or draped over the cargo box 4, the support members 28 are supported on the longitudinal portions 52 of each of the opposing side rail 32 such that the flexible cover 18 is further supported over the cargo box 4. Preferably, each respective end of each support member 28 includes a removable fastener 29 that corresponds to a removable fastener 24 on the flexible cover 18. The removable fastener 29 located on the support member 28 is preferably a loop fastener that encircles the support member 28 such that any vibration of the side rail 32 is dampened by the removable fastener 29. When the vibration is dampened, the support members 28 have less of a tendency to bounce on the longitudinal portions 52 when the pickup truck 2 is being driven, which reduces noise and wear on the flexible cover 18. Once the flexible cover 18 is fully positioned over the cargo box 4, a user can run their hand along the top of the flexible cover 18 along the component of strip fastening material 22 of the cover 18 to engage the component of strip fastening material 22 with the second component of strip fastening material 64 on the side rail 32.

Referring now also to FIG. 5A, an alternate embodiment of a side rail assembly 230 is illustrated. In this embodiment, the side rail assembly 230 includes a side rail 232 having a securing portion 234 that can be operatively connected to the sidewall 6 of the pickup truck 2 with self-tapping screws 17 or the like. Extending from the securing portion 234 is a fastener support member 244 having a receiving surface 246 on which a component of strip fastener 264 can be secured. In embodiments where the component of strip fastener 264 is multi-directional hook fastener such as that shown in FIG. 5A, the side rail 232 preferably includes a ridge 260 extending upwardly from the receiving surface 246 and along the distal retaining portion 256 of the side rail 232 to prevent premature engagement of the components of strip fastener 264, 22 when the flexible cover 18 is being secured over the cargo box 4 (see also, FIG. 2). In this embodiment, the fastener support member 244 includes a pair of retaining portions 254, 256 that cooperate with the receiving surface 246 to form a channel 258 in which the first component of strip fastener 264 is secured. In other alternative embodiments, the first component of strip fastener 264 can be directional hook fastener as will be described below. The use of directional hook fastener minimizes the negative consequences of premature engagement of the components of strip fastener.

Referring now also to FIG. 5B side rail assembly 330 having a side rail 332 similar to that of FIG. 5A is illustrated. In this embodiment, however, a component of strip fastener 364 is illustrated, that includes a slat 368 including a ridge 362. Since the ridge 362 is provided by the component of strip fastener 364 that resides in the channel 58, there is no need for a ridge on the distal retaining portion 356.

FIGS. 6-7 illustrate additional embodiments of side rails assemblies 430, 530. In these embodiments, a securing portion 434, 534 of the respective side rails 432, 532 can be operatively connected to the respective sidewall 6 with at least one clamp 16 in a manner shown and described in relation to FIG. 3A. Extending from the securing portion 434, 534 is a fastener support member 444, 544 having a receiving surface 446, 546. Similar to the embodiment of FIG. 5A, the fastener support member 444, 544 includes retaining portions 454, 456, and 554, 556, wherein the distal retaining portions 456, 556 include a ridge 460, 560. As previously discussed, the ridge 460, 560 prevents premature engagement of a component of strip fastener that is preferably secured proximate the receiving surface 446, 546. The embodiment of FIG. 7 further includes upper retaining lip 557 located immediately below the ridge 560. The upper retaining lip 557 provides an alternate channel 559 to retain the strip fastener component 564 shown only schematically in phantom residing alternatively in each of the lower channel 558 and the upper channel 559. In either case, the raise ridge 560 will minimize any potential premature engagement of the respective strip fastener components. When the first component of strip fastener 564 resides in the upper channel 559, the strip fastener component 564 will only rest on the receiving surface 546 at the side near the proximal retaining portion 554 and will be raised and reside at angle to the receiving surface 546 near the distal retaining portion 556 that is positioned closest to the center of the cargo box 4. The embodiments of FIGS. 6-7 further include a connecting member 440, 540 that interconnects the fastener support member 444, 544 to a longitudinal portion 452 on which support members 28 of the flexible cover 18 are supported (see also, FIG. 4). As previously discussed above, the ridge 460, 560 can be substituted or enhanced by additionally using directional hook fastener instead of multi-directional hook fastener.

Figure 8A:
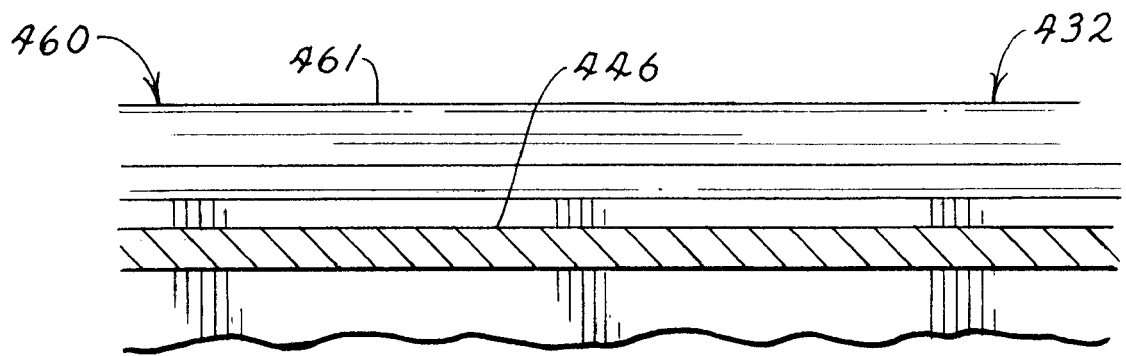
FIG. 8A is a partial, cross-sectional view of the ridge of FIG. 6 as viewed along line 8A-8A of FIG. 6.

Referring now also to FIG. 8A, a partial side view of the ridge 460 of FIG. 6 is shown. The ridge 460, in this embodiment, has a continuous raised portion 461 that extends the general length of the side rail 432. The ridge 460 of the present invention prevents premature engagement of the respective components of strip fastener (not shown), wherein one component is attached to the receiving surface 446 and the other component of strip fastener is attached to the underside of the flexible cover 18 as previously discussed. In preferred embodiments, the fastener support member 444, 544 includes retaining portions 454, 554 and 456, 556, respectively that, in combination with the receiving surface 446, 546 define a channel 458, 558 in which a first component of strip fastener can be secured (not shown). In alternate embodiments, the component of strip fastener can be secured with rivets, adhesive or the like. The preferred ridge 460 has a height H1 that is taller than the height H3 of the proximal retaining portion 456 or a lip 456a of the distal retaining portion 456, of which the ridge 460 is a part. This is so that the flexible cover 18 will ride along the ridge 460, and not another element of the side rail 432, when being draped over the cargo box 4 (see also, FIG. 4). Although the side rail 432 of FIG. 6 includes a generally horizontal fastener support member 444, it will be appreciated that providing a ridge having a height H1 greater than any element of the fastener support member for all side rails of similar embodiments is preferred.

Figure 8B:
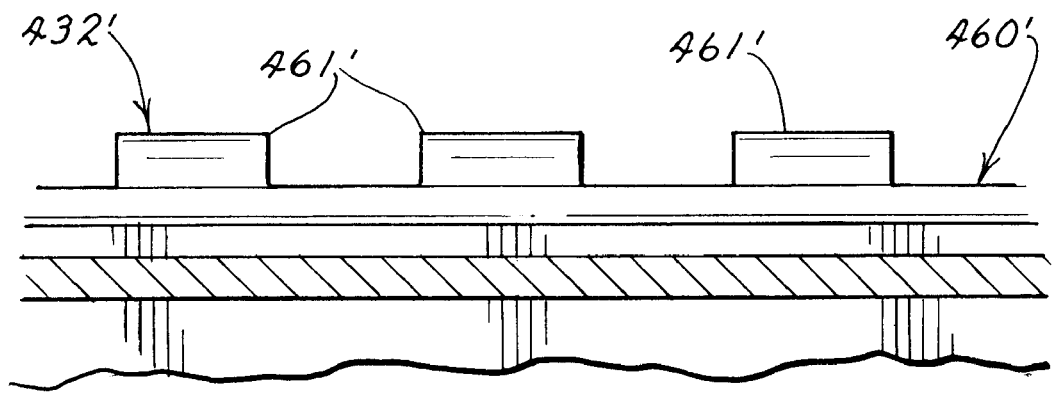
FIG. 8B is a partial, cross-sectional view of an alternate ridge similar to that of FIG. 8A, but showing a discontinuous or intermittent ridge.

FIG. 8B illustrates one of many alternate ridge configurations of the present invention similar to that shown in FIG. 8A. In this embodiment, the ridge 460' includes a plurality of raised portions 461' positioned along the length of the side rail 432'. In further alternate embodiments (not shown), the ridge can include one or more raised portions extending various lengths of the side rail. It will be obvious to one of ordinary skill in the art that, in light of this disclosure, there are many ridge configurations can be used that will result in substantially similar function.

FIG. 9 illustrates a rear securing plate 70 that is used to secure the rear end or lateral side 21 of the flexible cover 18 to the cargo box 4. The securing plate 70 includes a distal edge 72 having a first channel 76, in which a portion of the lateral side 21 of the flexible cover 18 is secured. The first channel 76 is sized and configured such that one of the lateral sides 21 of the flexible cover 18 can be force fit and retained around a cord 74 within the first channel 76 with a screw 90. The securing plate 70 preferably also includes a second channel 77, which is sized to slidingly receive a locking member (not shown). The locking member can be of the type disclosed in U.S. Pat. No. 6,534,835, the disclosure of which has been incorporated herein by reference. In preferred embodiments, the second channel 77 is generally T-shaped and includes opposing sidewalls 78, an upper wall 80 and opposing flanges 82. When the securing plate 70 is rotated or pivoted into a closed position against a pair of securing plate engagement members 86 on the respective opposing sidewalls 32, only one of which is shown, a peak or crest 84 of the securing plate 70 contacts a pivot point 88 of the engagement member or strike 86.

The preferred securing plate strike or engagement member 86 is illustrated in FIGS. 9-11. The preferred tonneau cover assembly 1 includes two securing plate engagement members 86, one attached to each respective side rail 32, preferably with an embedded threaded screw 87 coupled with a reciprocating nut 89 or the like. Alternatively, a hole (not shown) could be created in the strike to receive a simple bolt (not shown) that could secure the strike to the side rail 32 (see also, FIG. 2). Each securing plate engagement member 86 includes an engagement area 92 having a contoured portion 94 and the pivot point 88. To secure the flexible cover 18 over the cargo box 4, when the front securing plate 71 is already attached to the respective side rails 32, the rear securing plate 70 is inserted within the engagement area 92. The distal end 72 of the securing plate 70 is then pushed downward and the peak or crest 84 will engage and then pivot against the pivot point 88 of the respective engagement member 86 until the securing plate 70 is in the closed position shown in FIG. 9. The securing plate 70 preferably exerts a tensile force upon the flexible cover 18 so that the flexible cover 18 will stretch and remain taut over the cargo box 4. As the securing plate 70 pivots with respect to the pivot point 88, it will be appreciated that the distal end 72 will pull the flexible cover toward the rear of the cargo box 4. As this process of closing the preferred tonneau cover apparatus 1 proceeds, the longitudinal sides 20 of flexible cover 18 will be pulled backward over the ridges 60 of the side rails 32. In alternate embodiments, other raised ridges 260, 460, 560, 460', 162 provided either by the side rails 232, 432, 532, 432' or the plastic slats 168 support the sides 20 of the flexible cover 18 to minimize premature engagement of the respective strip fastener components as discussed. The front securing plate 71 may be secured to the respective side rails 32 in a similar manner to that described for the rear securing plate 70 or in a manner similar to those systems described in U.S. Pat. Nos. 5,076,338 and 6,543,835, each of which has been incorporated herein by reference.

FIGS. 12-14B illustrate another preferred side rail assembly 630. The side rail assembly 630 includes a side rail 632 having a securing portion 634 that can secure the side rail 632 to the side wall 6. The side rail 632 further includes an inclined portion 638 having a receiving surface 646 in which a strip of directional strip hook fastener 666 can be secured in place of traditional, multi-directional hook fastener. Preferred embodiments include a connecting member 640 extending downwardly away from the inclined portion 638 and is interconnected to a longitudinal portion 652 that can provide support for a support bar (not shown) similar to that shown in FIG. 4.

Figure 14A:
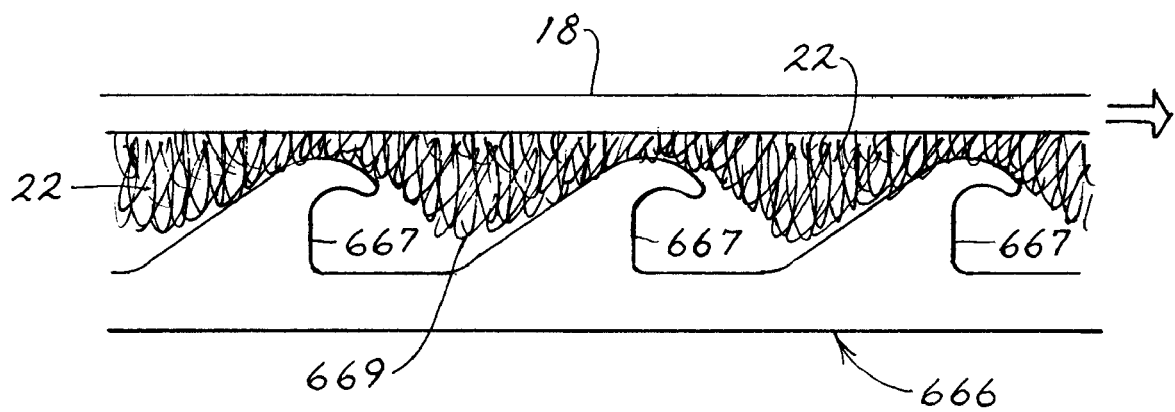
FIG. 14A is a schematic view of the directional hook fastener component shown FIG. 12 as seen from a line similar to line 13-13, but showing a loop fastener component on the flexible cover sliding toward the rear of the cargo box as the securing plate is drawing the cover toward the rear during a process of fully engaging the securing frame.
Figure 14B:
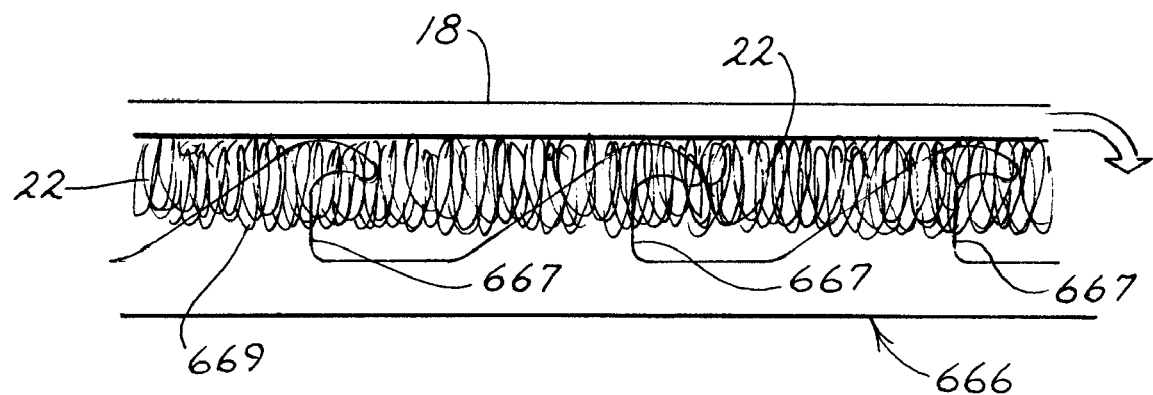
FIG. 14B is a view similar to that of FIG. 14A, except that the securing plate is fully engaged and the loop fastener component is engaged with the directional hook fastener component.

The preferred directional hook fastener 666 includes a plurality of hooks 667 that generally all face the same direction, unlike traditional multi-directional hook fastener that has a plurality of hooks facing multiple directions such that the hooks will engage loop fastener from all angles. In preferred embodiments, the directional fastener 666 is positioned on the receiving surface 646 such that the hooks 667 are uniformly facing the tailgate 12 (see also, FIG. 1) when the side rail 632 is operatively attached to the sidewall 6. In this position, the hooks 667 will generally not engage the component of hook and loop fastener 22, in this case loop fastener on the flexible cover 18, as the flexible cover 18 is being pulled over the cargo box 4 towards the tailgate 12 (see, in particular, FIG. 14A). Use of such directional hook fastener 666 reduces the wear and tear of the components of directional hook fastener 666 and corresponding component of loop fastener 22 on the flexible cover 18. Although there is no ridge to minimize premature engagement, the directional hooks 667, will release any prematurely engaged loop structures 669, when the directional hooks 667 are oriented toward the rear of the cargo box where the securing plate 70 will engage the respective strikes 86 and pull the flexible cover 18 backward toward the rear of the cargo box, thereby stretching the flexible cover 18 and drawing it tautly over the cargo box 4 and the securing frame (not shown). As shown in FIG. 14A, when this occurs, the loop structures 669 simply slide over the directional hooks 667. Once the flexible cover 18 has been drawn over the cargo box 4, the user can simply run their hand across the top of the cover 18, proximate the components of hook and loop fastener 666, 22 to engage the loop fastener 22 with the hook fastener 666 as shown in FIG. 14B).

Directional hook fastener can be made, for example, in accordance with the teachings of U.S. Pat. Nos. 7,172,008 (Vanbenschoten et al.); 6,640,348 (Clune et al.); or 6,258,311 (Jens et al.) the disclosures of which are herby incorporated herein by reference.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An elongated side rail for attachment to a sidewall of a pickup truck cargo box as a portion of a tonneau cover assembly, the elongated side rail comprising:
   a securing portion that can be operatively connected to the sidewall;
   an inclined portion extending from the securing portion, the inclined portion having a first edge and a second edge;
   a connecting member extending downwardly away from the inclined portion from a position located between the first and second edges; and
   a longitudinal portion extending from the connecting member opposite the inclined portion.

2. The elongated side rail of claim 1, wherein the connecting member extends downwardly at an angle of about 90° from the inclined portion.

3. The elongated side rail of claim 1, further comprising a receiving surface and a retaining portion on each respective edge of the inclined portion; wherein the retaining portions and the receiving surface form a channel.

4. The elongated side rail of claim 1, wherein the inclined portion includes a thick portion and a thin portion, the thick portion having a first thickness and the thin portion having a second thickness, the first thickness being greater than the second thickness.

5. The elongated side rail of claim 1, wherein the first edge is proximate the securing portion, and the second edge is distal to the securing portion and the thickness of the inclined portion reduces as the inclined portion extends from the securing portion, past the interconnection with the connecting member in a direction toward the second edge.

6. The elongated side rail of claim 1, further comprising a strip of directional hook fastening material on the inclined portion.

7. The elongated side rail of claim 1, further comprising a strip of fastening material on the inclined portion.

8. The elongated side rail of claim 1, wherein the securing portion includes an engaging surface for engaging the sidewall, and the longitudinal portion extends in a direction that is generally perpendicular to the orientation of the engaging surface.

9. An elongated side rail for attachment to a sidewall of a pickup truck as a portion of a tonneau cover assembly, the elongated side rail comprising:
   a securing portion having an engaging surface that can be operatively connected to the sidewall;
   an inclined portion extending from the securing portion at an angle of from about 90° to about 135° relative to a plane in which the engaging surface resides, the inclined portion having a receiving surface, a first edge and a second edge;
   a connecting member extending downwardly away from the inclined portion from a position located between the first and second edges; and
   a longitudinal portion extending from the connecting member opposite the receiving surface.

10. The elongated side rail of claim 9, further comprising a retaining portion at each respective edge of the inclined portion such that the retaining portions and receiving surface form a channel.

11. The elongated side rail of claim 10, wherein the connecting member extends downwardly away from the inclined portion at an angle of about 90° relative to a plane in which the receiving surface resides.

12. The elongated side rail of claim 9, wherein the first edge is proximate the securing portion and the second edge is distal to the securing portion; wherein the thickness of the inclined portion reduces as the inclined portion extends from the securing portion, past the interconnection with the connecting member in a direction toward the second edge.

13. The elongated side rail of claim 9, further comprising a strip of fastening material secured to the inclined portion.

14. A tonneau cover assembly for attachment to a pickup truck having a cargo box, the tonneau cover assembly comprising:
   a flexible cover having two opposing longitudinal sides, two opposing lateral sides and an underside, two first fastening members each of which is attached to the underside proximate one of the respective opposing longitudinal sides;
   two elongated side rail assemblies, each elongated side rail assembly including:
      a side rail having a securing portion and an inclined portion extending from the securing portion, the inclined portion having a channel structure defining a channel, the inclined portion having a first edge and a second edge and the channel structure having a retaining portion at each respective edge of the inclined portion;
      a second fastening material within the channel; wherein the first fastening material can be removably secured to the second fastening material;
      a connecting member extending downwardly between the first and second edges of the inclined portion opposite the channel structure; and a longitudinal portion extending from the connecting member.

15. The tonneau cover assembly of claim 14, wherein the first and second fastening materials are selected from the group consisting of strips of hook fastener and loop fasteners.

16. The tonneau cover assembly of claim 15, further comprising a securing plate attached to one of the longitudinal sides of the flexible cover that removably secures one of the lateral sides of the flexible cover to the each of the elongated side rails.

17. The tonneau cover assembly of claim 14, wherein the channel structure further includes a third retaining portion located above the retaining portion at the edge of the inclined portion furthest from the securing portion.

18. An elongated side rail for attachment to a side wall of a pickup truck cargo box having a front and a tailgate, the elongated side rail being a portion of a tonneau cover assembly, the elongated side rail comprising:
  a securing portion that can be secured to the sidewall;
  a fastener support member interconnected to the securing portion, the fastener support member including a receiving surface having first and second edges; wherein the first edge is closest to a center of the cargo box when the elongated side rail is operatively secured to the sidewall;
  a component of strip fastening material having a height, the component of strip fastening material being located on the receiving surface between the first and second edges; and
  a ridge located proximate the first edge of the receiving surface; the ridge having a height with respect to the receiving surface higher than the height of the fastening strip, the ridge also extending above the second edge with respect to the receiving surface.

19. The elongated side rail of claim 18, wherein, when the elongated side rail is attached to the sidewall, the fastener support member at least partially overlaps the sidewall.

20. The elongated side rail of claim 18, further comprising a retaining member proximate each respective edge of the receiving surface, wherein a first height of the ridge, with respect to the receiving surface, is higher than a height of each retaining member, with respect to the receiving surface.

21. The elongated side rail of claim 18, further comprising a connecting member extending downwardly from the fastener support member; the elongated side rail further comprising a longitudinal portion extending from the connecting member in a direction that is generally perpendicular to an engaging surface of the securing portion.

22. The elongated side rail of claim 18, wherein the ridge is a continuous raised portion.

23. The elongated side rail of claim 18, wherein the ridge is a plurality of discontinuous raised portions.

24. The elongated side rail of claim 18, wherein the ridge extends along a portion of the side rail proximate a front portion of the cargo box when the side rail is operatively attached to the sidewall.

25. The elongated side rail of claim 18, wherein the receiving surface is perpendicular to an engaging surface of the securing portion.

26. The elongated side rail of claim 18, wherein the receiving surface is at an angle from about 90° to about 135° with respect to an engaging surface of the securing portion.

27. The elongated side rail of claim 18, wherein the ridge is located on the receiving surface.

28. A tonneau cover assembly for attachment to a pickup truck, the tonneau cover assembly comprising:
  a flexible cover having two opposing longitudinal sides, two opposing lateral sides and an underside, a first component of strip fastening material disposed on the underside proximate each longitudinal side; and
  two elongated side rail assemblies, each elongated side rail assembly including:
    a securing portion that can be secured to the sidewall;
    a fastener support member interconnected to the securing portion, the fastener support member including a receiving surface having first and second edges; wherein the first edge is closest to a center of the cargo box when the elongated side rail is operatively secured to the sidewall;
    a second component of strip fastening material having a height with respect to the receiving surface, the second component of strip fastening material secured on the receiving surface in between the first and second edges; wherein the first component of strip fastening material can be removably secured to the second component of strip fastening material; and
    a ridge located proximate the first edge of the receiving surface; the ridge having a height that is higher with respect to the receiving surface than a height of the second component of strip fastening material and a height of the second edge.

29. The tonneau cover assembly of claim 28, wherein the fastener support member at least partially overlaps the side wall when the elongated side rail is attached to the sidewall.

30. The tonneau cover assembly of claim 28, further comprising a connecting member extending downwardly from the fastener support member; the elongated side rail assembly further comprising a longitudinal portion extending in a direction from the connecting member that is perpendicular to an engaging surface of the securing portion.

31. The tonneau cover assembly of claim 30, wherein the connecting member extends downwardly from the fastener support member at an angle of about 90° with respect to the receiving surface.

32. The tonneau cover assembly of claim 28, wherein the ridge is a continuous raised portion extending generally along the length of the fastener support member.

33. The tonneau cover assembly of claim 28, wherein the ridge is a plurality of discontinuous raised portions.

34. The tonneau cover assembly of claim 28, wherein the receiving surface extends in a direction that is generally perpendicular to an engaging surface of the securing portion.

35. The tonneau cover assembly of claim 28, wherein the second component of strip fastening material is a hook fastener.

36. The tonneau cover assembly of claim 28, further comprising a retaining member on each side of the receiving surface; wherein the ridge extends higher, with respect to the receiving surface, than each of the retaining members.

37. The tonneau cover assembly of claim 28, further comprising a securing plate attached to one of the lateral sides of the flexible cover.

38. The tonneau cover assembly of claim 28, wherein the receiving surface of the fastener support member resides generally in a plane that is at an angle of about 90° to about 135° with respect to an engaging surface of the securing portion.

39. The tonneau cover assembly of claim 38, wherein the receiving surface of the fastener support member resides generally in a plane that is at an angle of about 90° to about 120° with respect to an engaging surface of the securing portion.

40. A method of securing a flexible cover of a tonneau cover apparatus over a cargo box of a pickup truck; the method comprising the steps of:
  providing a pickup truck having a cargo box having two cargo box lateral sides;

providing a tonneau cover assembly including a flexible cover having two opposing longitudinal sides, two opposing lateral sides and an underside, a first component of strip fastening material attached to the underside proximate each longitudinal side; the tonneau cover assembly further including two elongated side rail assemblies each having a fastener support member interconnected to a securing portion, the fastener support member including a receiving surface having first and second edges; wherein the first edge is closest to a center of the cargo box when the elongated side rail is operatively secured to the sidewall; each side rail including a second component of strip fastening material secured proximate the receiving surface having a first height with respect to the receiving surface, the second component of strip fastening material secured on the receiving surface in between the first and second edges; wherein the first component of strip fastening material can be removably secured to the second component of strip fastening material; the side rail additionally including a ridge located proximate the first edge of the receiving surface; the ridge having a second height with respect to the receiving surface, the second height being higher than the first height, the ridge also extending above the second edge with respect to the receiving surface;

securing one lateral side of the flexible cover to the cargo box;

grasping the unattached lateral side of the flexible cover; and pulling the flexible cover on the ridge of each respective side rail and over the cargo box such that that the ridge supports the first component of strip fastening material above the second component of strip fastening material.

41. The method of claim 40, further comprising the step of pressing the first component of strip fastening material on the flexible cover towards the second component of strip fastening material on the side rail such that the first and second components of strip fastening material are then engaged.

42. An elongated side rail for attachment to a side wall of a pickup truck having a tailgate, the elongated side rail being a portion of a tonneau cover assembly, the elongated side rail comprising:
a securing portion that can be secured to the sidewall;
a fastener support member interconnected to the securing portion; the fastener support member including a receiving surface having a first edge and a second edge; and
an elongated strip of directional hook fastener located between the first and second edges; wherein the receiving surface is oriented in a plane that is at an angle of about 90° to about 135° with respect to an engaging surface of the securing portion.

43. The elongated side rail of claim 42, wherein the directional hook fastener is of the type in which loop fastener can slide generally in one direction across the elongated strip of directional hook fastener without damaging loop structures of the loop fastener.

44. The elongated side rail of claim 42, wherein strip of directional hook fastener includes a plurality of inverted J-shaped hooks; wherein the strip of directional hook fastener is positioned on the receiving surface such that the hooks are facing the tailgate when the side rail is operatively attached to the sidewall.

45. The elongated side rail of claim 42, further comprising a retaining member on each side of the receiving surface forming a channel in which the strip of directional hook fastener is located.

46. The elongated side rail of claim 42, further comprising an adhesive retaining the strip of directional hook fastener to the receiving surface.

47. The elongated side rail of claim 42, wherein, when the elongated side rail is attached to the sidewall, the fastener support member at least partially overlaps the sidewall.

48. The elongated side rail of claim 42, further comprising a connecting member extending downwardly from the fastener support member; the elongated side rail further comprising a longitudinal portion extending from the connecting member, perpendicular to the securing portion.

49. The elongated side rail of claim 48, wherein the connecting member extends downwardly from the fastener support member at an angle of about 90° with respect to a plane consistent with the receiving surface.

50. The elongated side rail of claim 42, wherein the receiving surface is perpendicular to the securing portion.

51. A tonneau cover assembly for attachment to a pickup truck having a tailgate, the tonneau cover assembly comprising:
a flexible tonneau cover having two opposing longitudinal sides, two opposing lateral sides and an underside, a first fastening material disposed the underside proximate each longitudinal side;
a securing plate attached to one of the lateral sides of the flexible cover; and
two elongated side rail assemblies, each elongated side rail assembly including:
a securing portion that can be secured to the sidewall;
a fastener support member interconnected to the securing portion; the fastener support member including a receiving surface having a first edge and a second edge; and
an elongated strip of directional hook fastener located between the first and second edges; wherein the first fastening material can be removably secured to the elongated strip of directional hook fastener.

52. The tonneau cover assembly of claim 51, wherein, when the elongated side rail is attached to the sidewall, the fastener support member at least partially overlaps the sidewall.

53. The tonneau cover assembly of claim 51, further comprising a connecting member extending downwardly from the fastener support member; the elongated side rail further comprising a longitudinal portion extending from the connecting member and perpendicular to an engaging surface of the securing portion.

54. The tonneau cover assembly of claim 53, wherein the connecting member extends downwardly from the fastener support member at an angle of about 90° with respect to a plane consistent with the receiving surface.

55. The tonneau cover assembly of claim 51, wherein the receiving surface is generally perpendicular to an engaging surface of the securing portion.

56. The tonneau cover assembly of claim 51, wherein the directional hook fastener includes a plurality of inverted J-shaped hooks; wherein the strip of directional hook fastener is positioned on the receiving surface such that the hooks are facing the tailgate when the side rail is operatively attached to the side wall.

57. The tonneau cover assembly of claim 51, wherein the receiving surface is oriented at an angle of about 90° to about 135° to an engaging surface of the securing portion.

58. The elongated side rail of claim 51, wherein the directional hook fastener is of the type in which loop fastener can slide generally in one direction across the elongated strip of directional hook fastener without damaging loop structure of the loop fastener.

* * * * *